No. 725,803. PATENTED APR. 21, 1903.
R. C. TURNER.
APPARATUS FOR PURIFYING, STERILIZING, AND AGING LIQUIDS.
APPLICATION FILED MAY 29, 1902.
NO MODEL.
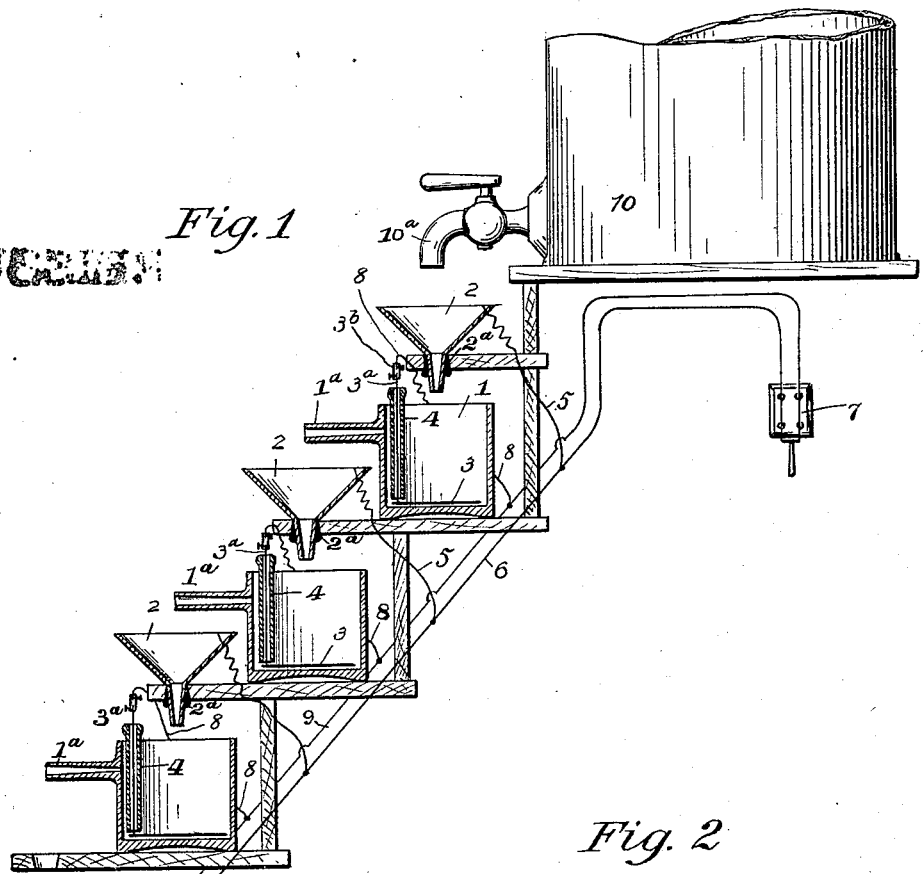
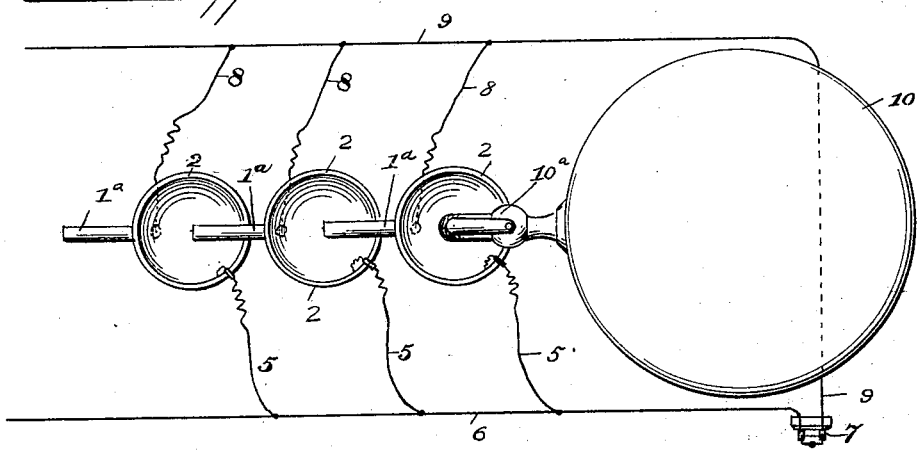

UNITED STATES PATENT OFFICE.

ROBERT C. TURNER, OF COLUMBUS, OHIO, ASSIGNOR OF ONE-HALF TO CLARENCE E. TURNER, OF COLUMBUS, OHIO.

APPARATUS FOR PURIFYING, STERILIZING, OR AGING LIQUIDS.

SPECIFICATION forming part of Letters Patent No. 725,803, dated April 21, 1903.

Application filed May 29, 1902. Serial No. 109,564. (No model.)

*To all whom it may concern:*

Be it known that I, ROBERT C. TURNER, a citizen of the United States, residing at Columbus, in the county of Franklin and State of Ohio, have invented certain new and useful Improvements in Apparatus for Purifying, Sterilizing, or Aging Liquids; and I do hereby declare the following to be a full, clear, and exact description of the invention, such as will enable others skilled in the art to which it appertains to make and use the same.

This invention relates to apparatus for purifying, sterilizing, or aging liquids; and it consists in improvements upon the apparatus shown in my Letters Patent of the United States No. 524,121, dated August 7, 1894.

With my present apparatus I am enabled to subject the liquid to be purified, sterilized, or aged to successive electrolytic treatments, the apparatus being so designed that the liquid flows after treatment in one vessel into another or several others in succession, where it is similarly treated.

In the accompanying drawings, Figure 1 is a vertical sectional view, some parts being in full lines. Fig. 2 is a diagrammatic plan view.

In the views, 1 designates a vessel of porcelain, glass, or other non-conductor of electricity and of any suitable form and having a spout $1^a$ near its top. There are to be several of these vessels 1, and they are shown to be arranged one above the other, so that their spouts $1^a$ can discharge into a metallic funnel 2, which constitutes one electrode supported with its discharging end above the liquid-level of but so as to discharge into the next vessel below. Arranged in each vessel 1 is an electrode 3, shown to consist of a flat piece or disk of metal, to which is soldered a vertical conducting rod or wire $3^a$; but surrounding the vertical conducting rod or wire $3^a$ is an insulating-tube 4, of porcelain, glass, or other suitable non-conductor of electricity, extending from the bottom to the top of the vessel. To each of the funnels 2 is attached a conducting-wire 5, and all these wires 5 are connected to a main conducting-wire 6, running to a switchboard 7, containing an appropriate switching device. The funnels can be insulated from their supports by bushings $2^a$, of porcelain, glass, or other suitable non-conductor of electricity. Each of the vertical wires $3^a$ in the vessels 1 has coupled to it, by means of a suitable coupling device $3^b$, a conducting-wire 8, and all the wires 8 are connected to a main conducting-wire 9. The electric current will be furnished by any suitable generator or from any appropriate source of electricity.

10 denotes a vessel to contain the liquid to be treated and from which the liquid is discharged through a faucet $10^a$ into the uppermost vessel 1. As the liquid flows into the first vessel the stream from the funnel closes the electric circuit from the wire 5 to the wire 8 or reversely, and the stream from the funnel, as well as the liquid in the vessel, is subjected to the electrolytic action, due to the passage of the current therethrough. When the liquid in the uppermost vessel rises to the spout $1^a$, it flows into that next below and the electric current is closed through the next wires 5 and 8, and so on through the entire series of vessels. Furthermore, the stream flowing through each of the funnels, because it is small, continuous, and unbroken, is subjected to a higher degree of electric action and at the same time is subjected to the action of the oxygen of the air. The current of electricity will of course be made strong enough to bridge all the streams flowing from the funnels and the liquid in all the vessels. In this way the liquid as it flows down through the series of vessels is subjected successively to the action of electricity and air, and because the vessels have their spouts or outlets at their tops the liquid to be treated tarries a while in each vessel and is more thoroughly agitated and stirred. The treatment is therefore more thorough and perfect.

What I claim, and desire to secure by Letters Patent, is—

1. Apparatus for purifying, sterilizing or aging liquids comprising two or more separate vessels having spouts or outlets near their tops and arranged to discharge from one into the other, a metallic funnel constituting an electrode, arranged to discharge above the liquid-level of the vessel and a metallic piece also constituting an electrode in each of said vessels, and conductors of electricity attached to such electrodes.

2. Apparatus for purifying, sterilizing or aging liquids comprising two or more separate vessels having spouts or outlets near their tops and arranged to discharge from one into the other, a metallic funnel constituting an electrode arranged to discharge above the liquid-level of the vessel, a metallic piece in the bottom of said vessels also constituting an electrode, a conductor of electricity leading from the last-named electrodes out of said vessels, and insulating-tubes for said conductors, substantially as described.

In testimony whereof I affix my signature in presence of two witnesses.

ROBERT C. TURNER.

Witnesses:
GEO. M. FINCKEL,
SAMUEL W. LATHAM.